United States Patent [19]

Kuo et al.

[11] Patent Number: 5,048,953

[45] Date of Patent: Sep. 17, 1991

[54] OPTICAL COLLIMATING, LASER RAY TARGET POSITION INDICATING AND LASER RAY ABSORBING DEVICE OF A LASER SYSTEM

[75] Inventors: Sher-Cherng Kuo; Chin-Hen Fang; Yu-Hsiang Lai, all of Hsin-Chu, Taiwan

[73] Assignee: Industrial Technology Research Institute, Taiwan

[21] Appl. No.: 474,934

[22] Filed: Feb. 5, 1990

[51] Int. Cl.$^5$ .............................................. G01B 11/26
[52] U.S. Cl. .................................................... 356/153
[58] Field of Search ....................... 356/153, 138, 399; 219/121.76, 121.78

[56] References Cited

U.S. PATENT DOCUMENTS

4,319,839 3/1982 Durran ................................ 356/153
4,867,560 9/1989 Kunitsu .......................... 219/121.76

Primary Examiner—F. L. Evans
Assistant Examiner—K. P. Hantis
Attorney, Agent, or Firm—Cushman, Darby & Cushman

[57] ABSTRACT

An optical collimating, laser ray target position indicating and laser ray absorbing device, mounted between a laser generating source and a laser ray guiding device. The device includes a reference light source for facilitating optical collimation of the laser system and for indicating the target position of the laser ray, a first movable reflecting mirror set optionally disposed at a first position for performing optical collimation or at a second position for performing laser ray target position indication, a second movable reflecting mirror set which may be moved into or away from an operating position where light, a third movable reflecting mirror set, which includes a fourth reflecting mirror and a fifth reflecting mirror and may be moved into or away from an operating position where the fourth reflecting mirror interrupts, by reflecting, light from the laser generating source and the fifth reflecting mirror reflects light coming from the reference light source and reflected by the first movable reflecting mirror set disposed at the second position thereof to the laser ray guiding device for indicating the target position of the laser ray, and an absorption device for absorbing the laser ray coming from the laser generating source and reflected by the fourth reflecting mirror of the third movable reflecting mirror set.

10 Claims, 6 Drawing Sheets

OPTICAL COLLIMATING, LASER RAY TARGET POSITION INDICATING AND LASER RAY ABSORBING DEVICE OF A LASER SYSTEM

FIELD OF THE INVENTION

The present invention relates to a laser system and, more particularly, to an optical collimating, laser ray target position indicating and laser ray absorbing device which is mounted between a laser generating source and a laser ray guiding device and is capable of controlling the laser ray as an optical collimating, laser ray target position indicating and laser ray absorbing device.

BACKGROUND OF THE INVENTION

Nowadays, high power (above 10 W) laser systems have been widely used in military industries, material processing, medical treatment and many other high tech fields. Such high power laser systems should have a precise target position indicator so as to accurately indicate the target position of the high power laser beam for safety and quality reasons. Simultaneously, a switching device controlling the output of the high power laser ray must be used to meet various machining requirements. In addition, upon assembly and maintenance of the laser system, an optical collimating device capable of correcting the position of the optical mirror set in the resonant cavity must be installed to achieve an optimum transverse mode and power efficiency. The laser system currently used applies a switching device and a laser ray target position indicator in a combined system without an optical collimating device; consequently, a separate optical collimating device has to be installed, making the whole process very uneconomical.

SUMMARY OF THE INVENTION

The primary object of the present invention is to provide, between a laser generating source and a laser beam guiding device, a multi-functional device which may be optionally operated in an optical collimation mode, or a laser ray target position indication and laser ray absorption mode without the necessity of preparing a separate optical collimating device.

Another object of the present invention is to provide an improved optical collimating device of a laser system which needs only one collimation of the optical axis, thus saving the labor of installing the optical collimating device and performing optical collimation of the optical axis every time the laser system is to be operated.

In accordance with the first aspect of the present invention, an optical collimating, laser ray target position indicating and laser ray absorbing device, mounted between a laser generating source and a laser ray guiding device, comprises a reference light source, generating a reference light for facilitating the optical collimation of the laser system and for indicating the target position of the laser beam generated by the laser generating source; a first movable reflecting mirror set, reflecting light from the reference light source, which may be optionally disposed at a first position for performing optical collimation or at a second position for performing laser ray target position indication; a second movable reflecting mirror set which may be moved into or away from an operating position where light, coming from the reference light source and reflected by the first movable reflecting mirror set disposed at the first position thereof, may be reflected to the laser generating source for optical collimation purpose; a third movable reflecting mirror set, which includes a fourth reflecting mirror and a fifth reflecting mirror and may be moved into or away from an operating position where the fourth reflecting mirror interrupts, by reflecting, light from the laser generating source and the fifth reflecting mirror reflects light coming from the reference light source and reflected by the first movable reflecting mirror set disposed at the second position thereof to the laser ray guiding device for indicating the target position of the laser ray; and an absorption device for absorbing the laser ray coming from the laser generating source and reflected by the fourth reflecting mirror of the third movable reflecting mirror set.

In accordance with the second aspect of the present invention, an optical collimating, laser ray target position indicating and laser ray absorbing device, mounted between a laser generating source and a laser ray guiding device, comprises a reference light source, generating a reference light for facilitating the optical collimation of the laser system and for indicating the target position of the laser ray; a first stationary reflecting mirror set reflecting light from the reference light source; a second movable reflecting mirror set which may be moved into or away from an operating position where light, coming from the reference light source and reflected by the first stationary reflecting mirror set, may be reflected to the laser generating source for optical collimation purpose; a third movable reflecting mirror set, which includes a fourth reflecting mirror and a fifth reflecting mirror and may be moved into or away from an operating position where the fourth reflecting mirror interrupts, by reflecting, light from the laser generating source and the fifth reflecting mirror reflects light coming from the reference light source and reflected by the first stationary reflecting mirror set, to the laser ray guiding device for indicating the target position of the laser ray; and an absorption device for absorbing the laser ray coming from the laser generating source and reflected by the fourth reflecting mirror of the third movable reflecting mirror set.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 1 is a schematic perspective view showing the arrangement of the apparatus in accordance with the first embodiment of the present invention;

DETAILED DESCRIPTION OF THE PREFERRED EMBODIMENT

FIG. 1 shows an optical collimating, laser ray target position indicating and laser ray absorbing device of a laser system which is mounted between a laser generating source 10 and a ray guiding system 70 and which may be optionally operated in an optical collimation mode for optical collimating of the laser system or in a target position indicating mode for indicating the target position of the laser beam. The device comprises a reference light source 20, a first movable reflecting mirror set 30, a second movable reflecting mirror set 40, a third movable reflecting mirror set 50 and an absorption device 60.

The reference light source 20 is used for providing a visible light which acts as a reference light for indicating the target position of the laser ray and for optical collimation of the laser system. A low power laser light, such as a 1 mW He-Ne laser, which is visible to human eyes, may be adopted as the reference light source 20. An optical adjusting plate 21 is attached to the front of the reference light source 20 and is provided with a through hole (not shown) which allows the reference light from the reference light source 20 to pass therethrough.

The first movable reflecting mirror set 30 is used to reflect the reference light coming from the reference light source 20 so as to change the direction of the reference light. This first movable reflecting mirror set 30 may be moved as desired along a sliding groove 31 in the direction of arrows C and D (see FIG. 1) which is parallel to the direction of the above-described reference light. The first movable reflecting mirror set 30 includes a reflecting mirror 32 and four adjusting screw 33 provided around the reflecting mirror 32 for adjusting the reflection angle of the latter. When acting as an element in the optical collimation mode (see also FIG. 3), the first movable reflecting mirror set 30 is moved to a first position, i.e. to one end of the sliding groove 31 in the direction of arrow D. when acting as an element in the target position indicating mode (see also FIG. 5), the first movable reflecting mirror set 30 is moved to a second position, i.e. to the other end of the sliding groove 31 in the direction of arrow C.

The second movable reflecting mirror set 40 is pivotally fixed to a frame 41 in which is provided with a through hole 42 allowing reference light to pass therethrough. When acting as a component in optical collimation mode (see FIGS. 1 and 3), the second movable reflecting mirror set 40 is rotated to an operating position in the direction of arrow E (FIG. 1) so that the reference light coming from the reference light source 20 and reflected by the first movable reflecting mirror set 30, disposed at its first position, may be reflected again by the second movable reflecting mirror set 40 to the laser generating source 10. Under all other conditions, the second movable reflecting mirror set 40 is moved away from this operating position in the direction of arrow F.

Figure 5:
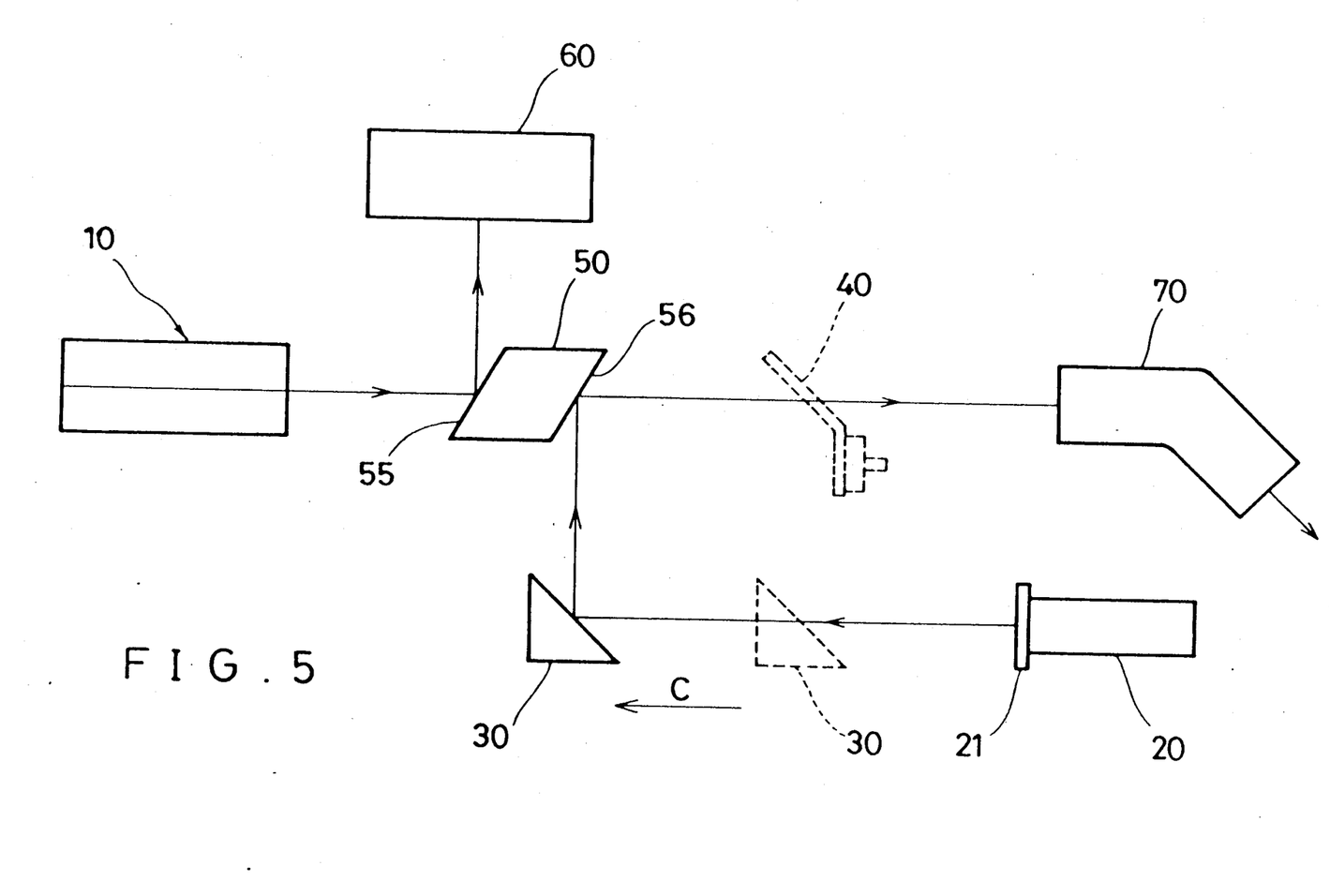
FIG. 5 is a schematic view showing the arrangement of the related elements in the apparatus of FIG. 1 in a laser ray target position indicating and laser ray absorption mode.

The third movable reflecting mirror set 50 may be slid in the direction of arrow A or B (See FIG. 1) along a guide rail 51 under the action of an air cylinder 52 controlled by a control valve 53. The third movable reflecting mirror set 50 comprises, on one side thereof, a fourth reflecting mirror 55 which substantially faces the laser generating source 10 and, on the opposite side thereof, a fifth reflecting mirror which substantially faces the second movable reflecting mirror set 40. When acting as an element in the target position indicating mode, the third movable reflecting mirror set 50 is moved in the direction of the arrow A into its operating position (as shown in FIGS. 1 and 5) so that the fourth reflecting mirror 55 obstructs and reflects the high power laser beam coming from the laser generating source 10 and, simultaneously, the fifth reflecting mirror 56 reflects the reference light coming from the reference light source 20 and reflected by the first movable reflecting mirror set 30, disposed at its second position described above, to the ray guiding system 70. Under all other conditions, the third movable reflecting mirror set 50 is moved away from its operating position, described above, in the direction B.

The absorption device 60 is used to absorb the high power laser beam of the laser generating source reflected from the fourth reflecting mirror 55 when the device of the present invention is operated in the target position indicating mode.

In addition, adjusting screws similar to the adjusting screws 33 of the first movable reflecting mirror set 30 may be provided for the second and third movable reflecting mirror sets 40 and 50 for rapid and precise optical collimation.

Figure 2:
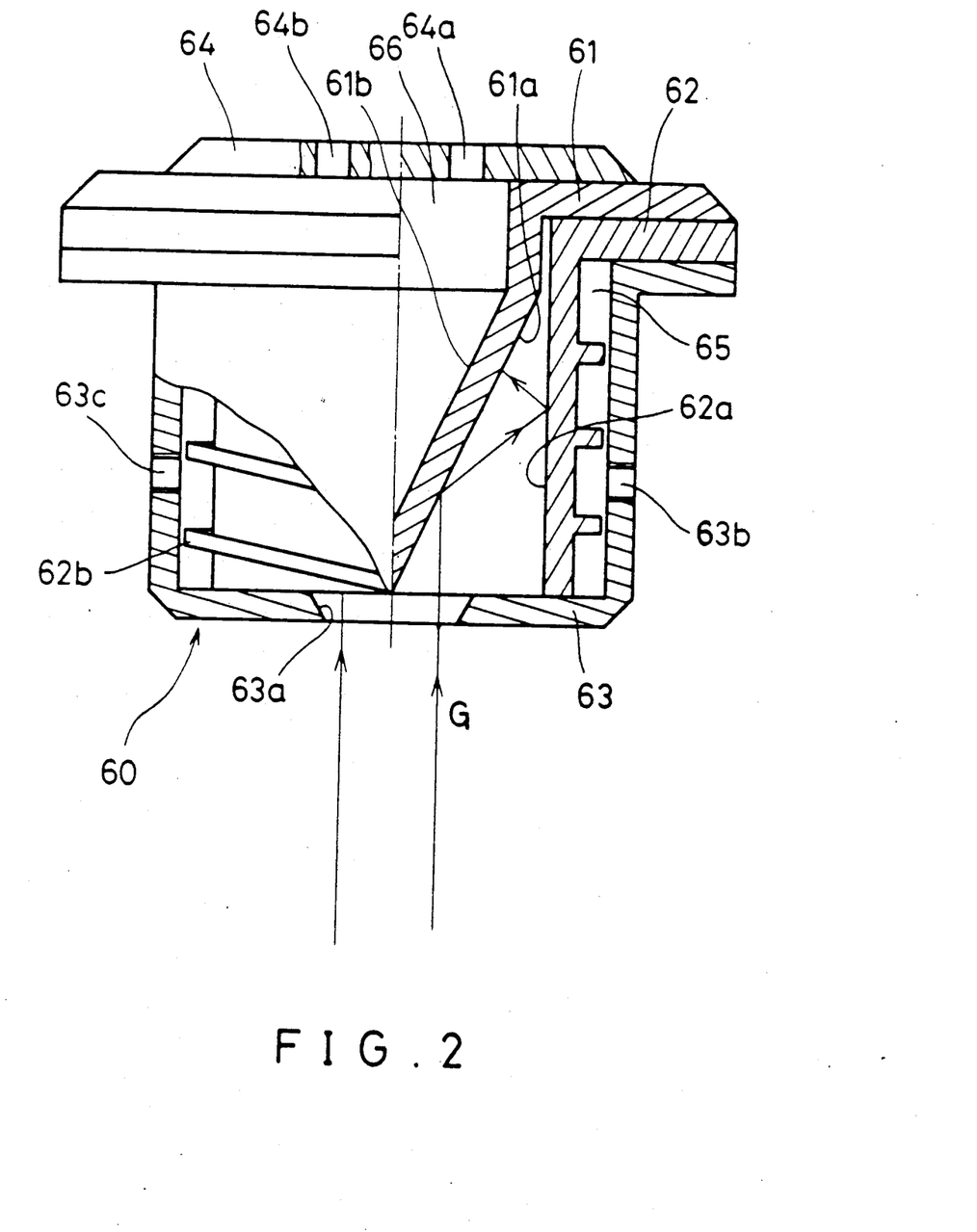
FIG. 2 is a fragmentary sectional view of the absorption device included in the apparatus of FIG. 1.

Referring now to FIG. 2, the absorption device 60 consists of a conical body 61, a cylindrical intermediate member 62, an outer case 63 and a cover 64. The outer case 63 has the shape of an inverted hat including a cylindrical portion, a flange extending outward from upper end of the cylindrical portion, and an end plate attached to the lower end of the cylindrical portion. An opening 63a is provided at the center of the end plate of the outer case 63 to allow the laser beam to pass therethrough. The conical body 61 generally takes the shape of an inverted hollow cone, having a cone angle of less than 90 degrees, with a flange extending outward from the base end of the cone. The intermediate member 62 is radially interposed between the outer case 63 and the conical body 61 and is spaced from the outer case 63 and the conical body 61. The intermediate member 62 includes, at its upper end, a radially outward extending flange which is fastened together with the flanges of the inverted conical body 61 and the outer case 63 so as to form a pair of repeated reflecting and absorbing surfaces between the outer conical surface 61a of the conical body 61 and the inner cylindrical surface 62a of the intermediate member 62, and to form a coolant jacket between the outer case 63 and the intermediate member 62. An inlet 63b and an outlet 63c for a coolant, such as water, are provided in the cylindrical portion of the outer case 63 for the circulation of the coolant so as to carry away the laser ray energy absorbed by the cylinder 62 which is to be described in more detail. The outer surface of the cylinder 62 is integrally formed with some cooling fins 62b for improving the cooling efficiency. The intermediate member 62 and the conical body 61 are made of good heat conductive materials, such as copper or aluminum, to improve the heat absorption ability thereof. Besides, for the same cooling purpose, another coolant jacket is formed between the inner conical surface 61b and the cover 64, for which cover 64 an inlet 64a and an outlet 64b are provided for the circulation of the coolant. When the high power laser ray emitting from the laser generating source 10 enters the absorption device 60 through the opening 63a (as shown by the direction of the arrow G in FIG. 2), the outer conical surface 61a of the conical body 61 partly reflects the incident laser ray to the inner circumferencial surface 62a of the intermediate member 62, and meanwhile it absorbs partly the energy of the incoming laser ray. Subsequently, the inner circumferencial surface 62a of the cylinder 62 reflects partly the reflected laser ray from the outer conical surface 61a of the conical body 61, and at the same time absorbs partly the energy of the reflected laser ray from the outer conical surface 61a. Consequently; the laser ray energy may be completely absorbed by the outer conical surface 61a of the conical body 61 and inner circumferencial surface 62a of the intermediate member 62 and then carried away by the coolant after repeated reflection in the absorption device 60.

Figure 3:
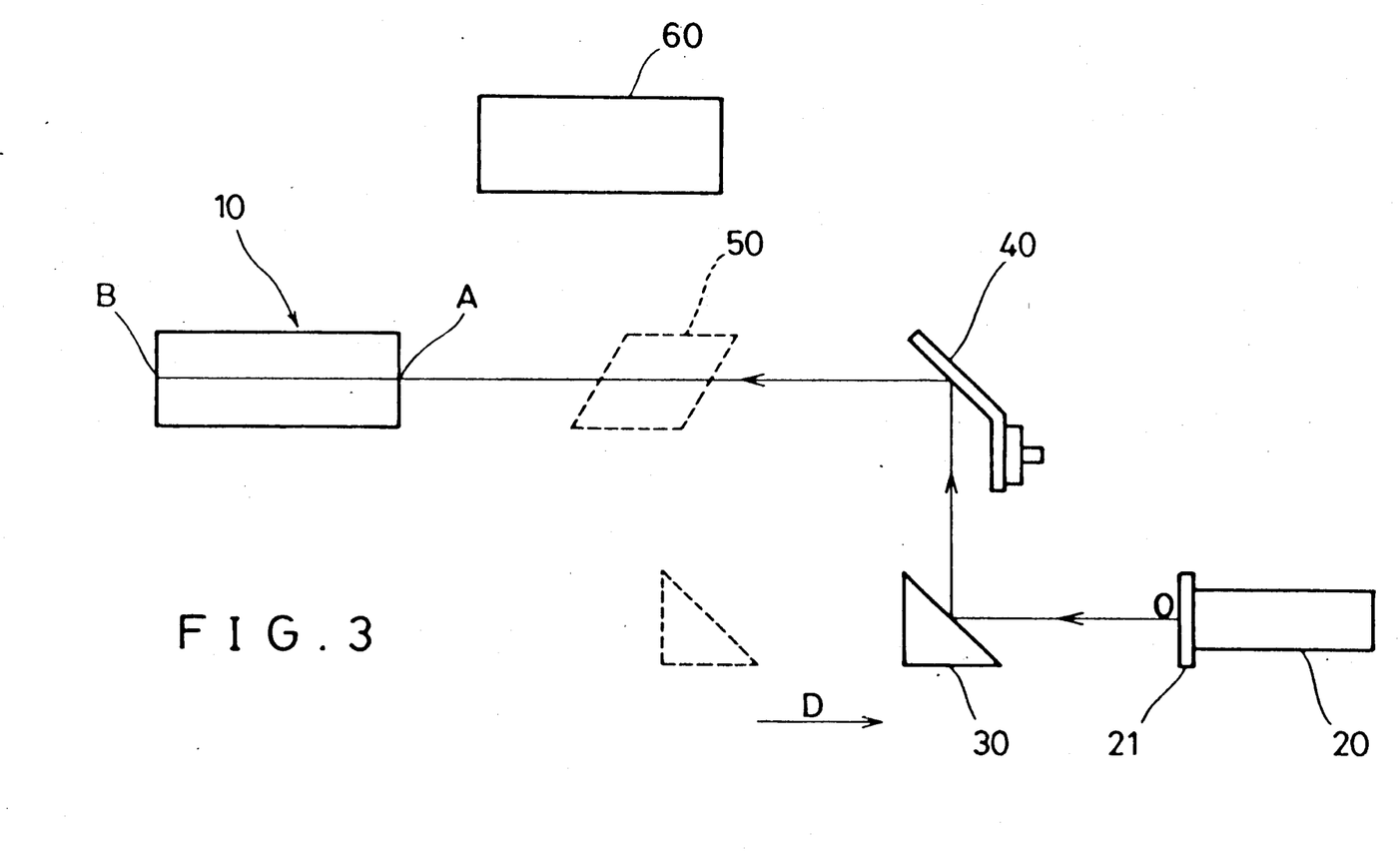
FIG. 3 is a schematic view showing the arrangement of the related elements in the apparatus of FIG. 1 in an optical collimation mode.

The detailed operation of an optical collimating, laser ray target position indicating and laser ray absorbing device in accordance with the present invention is now described as follows:

When the device of the present invention is operated in the optical collimation mode, the first movable reflecting mirror set 30 is moved in the direction D to its first position, the second movable reflecting mirror set 40 is rotated to its operating position in the direction E, and the third movable reflecting mirror set 50 (shown by dotted lines in FIG. 3) is moved away from its operating position in the direction B and the arrangement of the related elements in the device of the present invention is schematically shown in FIG. 3, wherein the first movable reflecting mirror set 30 is indicated by dotted lines in its second position and by solid line in its first position to show that it has been moved to its first position. A low power He-Ne reference visible laser light emitted by the reference light source 20 passes through a small through hole, point O, of the optical adjusting plate 21 and reaches the first movable reflecting mirror set 30 disposed at its first position. Subsequently, the first movable reflecting mirror set 30 reflects the incident reference light to the second movable reflecting mirror set 40, disposed at its operating position, and then the second movable reflecting mirror set 40 reflects the reference light to the laser generating source 10. By using the ajusting screws 33, the direction of the reflection of the first movable reflecting mirror set 30 can be properly adjusted to allow the reference light reflected by the second movable reflecting mirror set 40 to simultaneously pass through the central points A and B, respectively, of an outgoing mirror and a reflective mirror in the laser generating source 10, which also means that the reference light passes exactly through the optical path of the laser generating source 10. Sensors mounted at the central points A and B of the laser generating source 10 are used to detect the passage of the reference light therethrough. At position B of the laser generating source 10 a reflective mirror is installed which is adapted to allow the reference light to reflect back, along the same optical path of the reference light, to the central point A of the laser generating source 10. Subsequently, at position A of the laser generating source 10, an outgoing mirror, which is adapted to allow the reference light to reflect back, is installed along the same optical path of the reference light, to the point O of the optical adjusting plate 21 of the reference light source 20.

Figure 4:
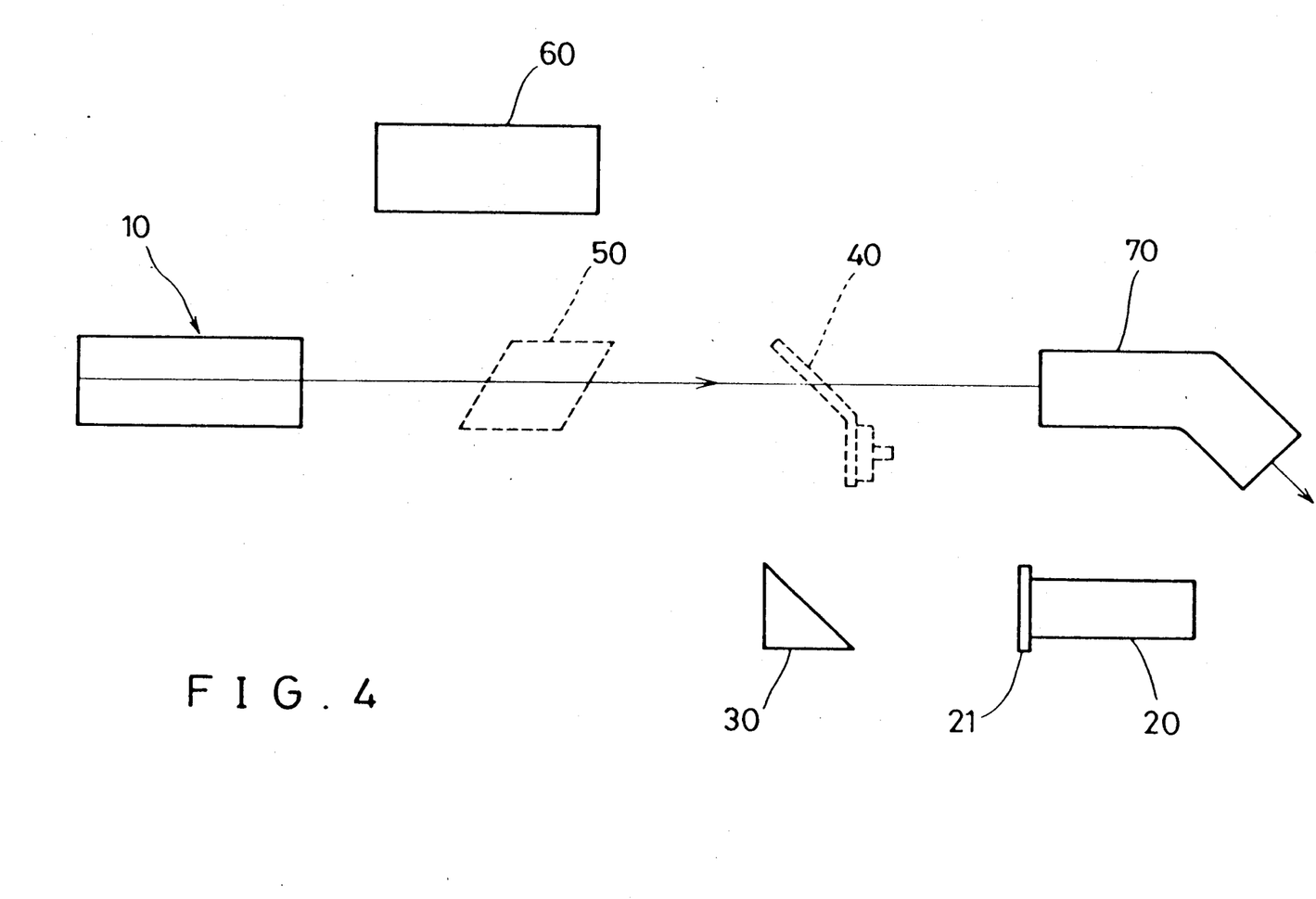
FIG. 4 is a schematic view showing the arrangement of the related elements in the apparatus of FIG. 1 upon identifying the optical path of the laser ray from the laser generating source.

Alternatively, the device of the present invention may also be operated in the laser ray target position indicating mode after the optical path of the high power laser beam emitted from the laser ray generating source 10 when actual use has been identified by the arrangement shown in FIG. 4, wherein the second and third movable reflecting mirror sets 40 and 50 are moved away from their operating positions, as shown by dotted lines, so that the laser ray coming from the laser generating source 10 may directly enter the ray guiding system 70 and pass through two sensors (not shown) within the ray guiding system 70 to mark any two points along the laser ray optical path so as to identify the optical path of the laser ray. Subsequently, the first movable reflecting mirror set 30 is moved to its second position, and the third movable reflecting mirror set 50 is moved to its operating position as shown in FIG. 5. The laser ray coming from the laser generating source 10 is reflected to the absorption device 60 by the fourth reflecting mirror 55 of the third movable reflecting mirror set 50 and is completely absorbed by the absorption device 60. Accordingly, the high power laser ray of the laser generating source 10 can be absorbed and thus "switched-off" when not in use. Simultaneously, the reference light coming from the reference light source 20 reaches the first movable reflecting mirror set 30 and is reflected to the fifth reflecting mirror 56 of the third movable reflecting mirror set 50 by the first movable reflecting mirror set 30. Next, the reference light is reflected to the ray guiding system 70 by the fifth reflecting mirror 56 of the third movable reflecting mirror set 50. By using the adjusting screws 33 of the first movable reflecting mirror set 30, the reference light can be adjusted to pass through the aforementioned two sensors installed within the ray guiding system 70, which means that the reference light has been made to pass through exactly the same optical path as the high power laser ray of the laser generating source 10 when the laser system is actually in use. Consequently, the reference light can be used to indicate the target position of the high power laser ray of the laser generating source 10.

Figure 6:
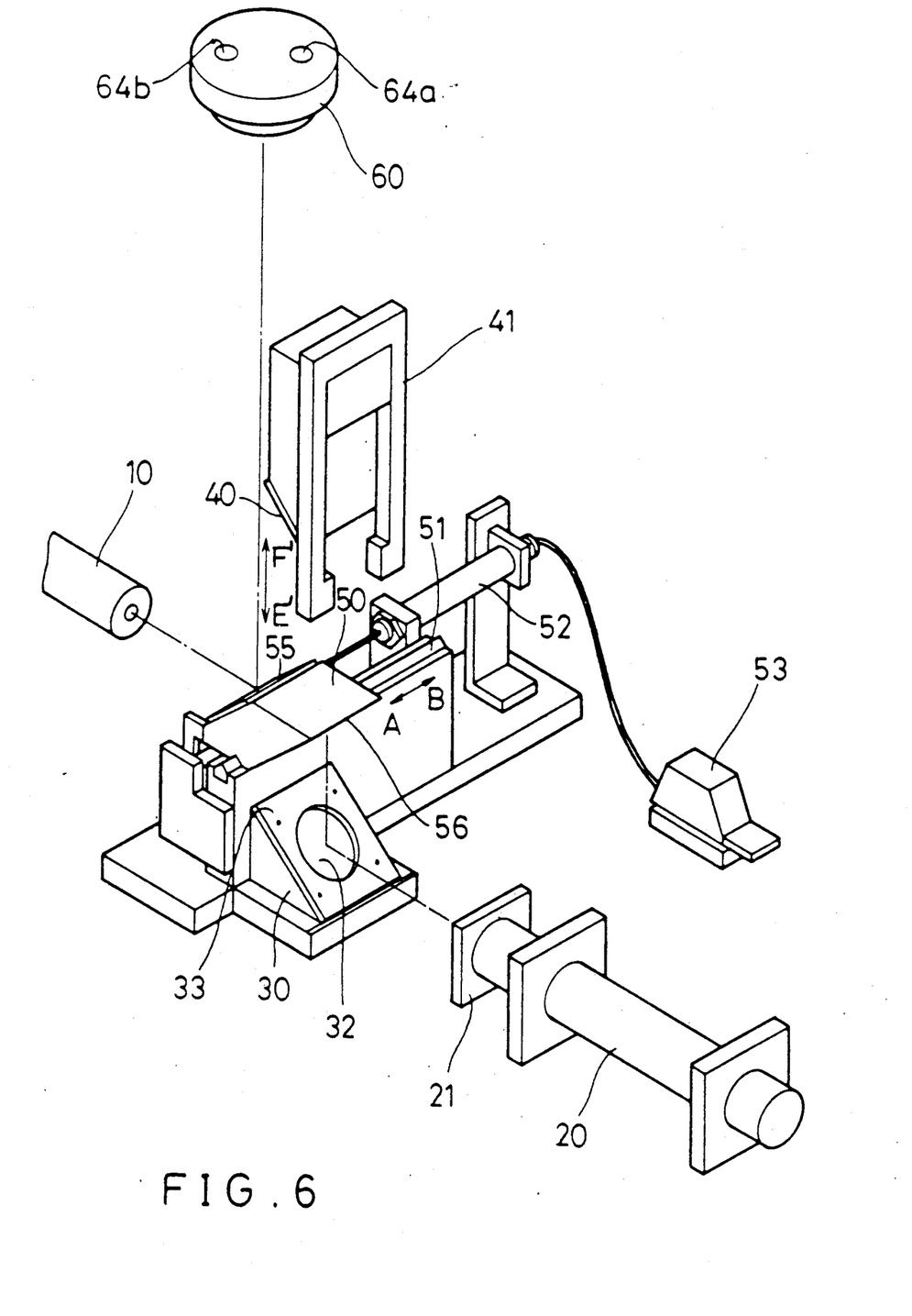
FIG. 6 is a schematic perspective view showing the arrangement of the apparatus in accordance with the second embodiment of the present invention.

The arrangement of the apparatus in accordance with the second embodiment of the present invention as shown in FIG. 6 is only slightly different from that of the first embodiment of the present invention as shown in FIG. 1. In the second embodiment, the first reflecting mirror set 30 is stationary rather than being movable as in the case of the first embodiment (FIG. 1). In addition, the second movable reflecting mirror set 40 is located over the first reflecting mirror set 30 in a vertically movable manner. The third reflecting mirror set 50 may be moved away from its operating position in the direction of arrow B and the second reflecting mirror set 40 lowered in the direction of arrow E' to enter its operating position so as to make the arrangement of the apparatus similar to the situation shown in FIG. 3 for performing optical collimation. On the contrary, the second reflecting mirror set 40 may be raised in the direction of arrow F' to move away from its operating position and the third reflecting mirror set 50 moved in the direction of arrow A to enter its operating position so as to make the arrangement of the apparatus similar to the situation shown in FIG. 5 for performing laser ray target position indication. However, in the second embodiment, the position of the first reflecting mirror set 30 remains unchanged for both optical collimation mode and laser ray target position indication mode.

The invention being thus described, it is obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical collimating, laser ray target position indicating and laser ray absorbing device of a laser system, mounted between a laser generating source and a laser ray guiding device, comprising:

a reference light source, generating a reference light for facilitating the optical collimation of said laser system and for indicating the target position of a laser beam generated by said laser generating source;

a first movable reflecting mirror, reflecting light from said reference light source, which may be disposed at one of a first position for performing optical collimation and a second position for performing laser ray target position indication;

a second movable reflecting mirror which may be moved one of into and away from an operating position where light, coming from said reference source and reflected by said first movable reflecting mirror disposed at said first position thereof, may be reflected to said laser generating source for optical collimation purpose;

a movable reflecting mirror set, including a fourth reflecting mirror and a fifth reflecting mirror, which may be moved one of into and away from an operating position where said fourth reflecting mirror interrupts, by reflecting, light from said laser generating source and said fifth reflecting mirror reflects light, coming from said reference light source and reflected by said first movable reflecting mirror disposed at said second position thereof, to said laser ray guiding device for indicating said target position of said laser beam; and an absorption device for absorbing said laser beam coming from said laser generating source and reflected by said fourth reflecting mirror of said movable reflecting mirror set.

2. An optical collimating, laser ray target position indicating and laser ray absorbing device of a laser system as claimed in claim 1, wherein said absorption device comprises a conical body generally taking the shape of an inverted hollow cone, including an outer surface having a cone angle less than 90 degrees and a cylindrical member including an outer surface and a cylindrical inner surface surrounding said conical body so as to form, on said outer surface of said conical body and said inner surface of said cylindrical member, opposed reflecting and absorbing surfaces which can repeatedly reflect and absorb a laser beam entering between said outer surface of said conical body and said inner surface of said cylindrical member.

3. An optical collimating, laser ray target position indicating and laser ray absorbing device of a laser system as claimed in claim 2, wherein said cylindrical member includes cooling fins formed on said outer surface thereof, and both said conical body and said cylindrical member are made of good heat-conductive materials.

4. An optical collimating, laser ray target position indicating and laser ray absorbing device of a laser ray system as claimed in claim 1, wherein said absorption device comprises at least one coolant jacket for carrying away energy absorbed from said laser beam.

5. An optical collimating, laser ray target position indicating and laser ray absorbing device of a laser system as claimed in claim 1, wherein said reference light is a low power visible laser light.

6. An optical collimating, laser ray target position indicating and laser ray absorbing device of a laser system, mounted between a laser generating source and a laser ray guiding device, comprising:

a reference light source, generating a reference light for facilitating the optical collimation of said laser system and for indicating the target position of a laser beam generated by said laser generating source;

a first stationary reflecting mirror, reflecting light from said reference light source;

a second movable reflecting mirror which may be moved one of into and away from an operating position where light, coming from the reference source and reflected by the first stationary reflecting mirror, may be reflected to the laser generating source for optical collimation purpose;

a movable reflecting mirror set, including a fourth reflecting mirror and a fifth reflecting mirror, which may be moved one of into and away from an operating position where the fourth reflecting mirror interrupts, by reflecting, light from the laser generating source and the fifth reflecting mirror reflects light, coming from the reference light source and reflected by said first stationary reflecting mirror to the laser ray guiding device for indicating said target position of the laser beam; and an absorption device for absorbing the laser beam coming from the laser generating source and reflected by said fourth reflecting mirror of the movable reflecting mirror set.

7. An optical collimating, laser ray target position indicating and laser ray absorbing device of a laser system as claimed in claim 2, wherein said absorption device comprises a conical body generally taking the shape of an inverted hollow cone, including an outer surface having a cone angle less than 90 degrees and a cylindrical member including an outer surface and a cylindrical inner surface surrounding said conical body so as to form, on said outer surface of said conical body and said inner surface of said cylindrical member, opposed reflecting and absorbing surfaces which can repeatedly reflect and absorb a laser beam entering between said outer surface of said conical body and said inner surface of said cylindrical member.

8. An optical collimating, laser ray target position indicating and laser ray absorbing device of a laser system as claimed in claim 7, wherein said cylindrical member includes cooling fins formed on said outer surface thereof, and both said conical body and said cylindrical member are made of good heat-conductive materials.

9. An optical collimating, laser ray target position indicating and laser ray absorbing device of a laser ray system as claimed in claim 6, wherein said absorption device comprises at least one coolant jacket for carrying away energy absorbed from said laser beam.

10. An optical collimating, laser ray target position indicating and laser ray absorbing device of a laser system as claimed in claim 6, wherein said reference light is a low power visible laser light.

* * * * *